(12) United States Patent
Boss et al.

(10) Patent No.: US 8,909,734 B2
(45) Date of Patent: Dec. 9, 2014

(54) MIGRATING DATA BETWEEN NETWORKED COMPUTING ENVIRONMENTS

(75) Inventors: Gregory J. Boss, Saginaw, MI (US); Christopher J. Dawson, Arlington, VA (US); Rick A. Hamilton, II, Charlottesville, VA (US); Brian M. O'Connell, RTP, NC (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 13/367,412

(22) Filed: Feb. 7, 2012

(65) Prior Publication Data

US 2013/0204963 A1 Aug. 8, 2013

(51) Int. Cl.
*G06F 15/16* (2006.01)
(52) U.S. Cl.
USPC .......................................................... 709/217
(58) Field of Classification Search
USPC ................................................ 709/217–219
See application file for complete search history.

(56) References Cited

U.S. PATENT DOCUMENTS

| 7,970,732 | B2 | 6/2011 | Jernigan et al. | |
|---|---|---|---|---|
| 2008/0080526 | A1 | 4/2008 | Gounares et al. | |
| 2010/0333116 | A1* | 12/2010 | Prahlad et al. | 719/328 |
| 2011/0022711 | A1 | 1/2011 | Cohn | |
| 2011/0055377 | A1 | 3/2011 | Dehaan | |
| 2011/0126197 | A1 | 5/2011 | Larsen et al. | |
| 2011/0179156 | A1* | 7/2011 | Ravichandran et al. | 709/223 |
| 2011/0302277 | A1* | 12/2011 | Baker | 709/219 |
| 2012/0059994 | A1* | 3/2012 | Montgomery et al. | 711/119 |

OTHER PUBLICATIONS

Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.
Tadwalkar, S., "Cloud Computing—Still a Long Way to Go", 25 pages. www.slideshare.net. Publication date not cited.

* cited by examiner

*Primary Examiner* — Vivek Srivastava
*Assistant Examiner* — Sibte Bukhari
(74) *Attorney, Agent, or Firm* — William E. Schiesser; Keohane & D'Alessandro, PLLC (57) ABSTRACT

Embodiments of the present invention provide an approach for predictively migrating data between network computing environments (e.g., cloud computing environments). Specifically, in a typical embodiment, data access patterns for sets of data utilized by a set of services running in a first networked computing environment may be analyzed. Based on the analysis one or more of the sets of data may be identified as candidates to be migrated from the first networked computing environment to a second networked computing environment. Then, a data migration protocol for the one or more sets of data to be migrated to the second networked computing environment may be generated based on the data access patterns and a predicted data migration time. Based on the data migration protocol, the one or more sets of data may then be migrated to the second networked computing environment.

19 Claims, 6 Drawing Sheets

MIGRATING DATA BETWEEN NETWORKED COMPUTING ENVIRONMENTS

TECHNICAL FIELD

In general, embodiments of the present invention relate to data migration. Specifically, embodiments of the present invention relate to data migration between networked computing environments (e.g., cloud computing environments)

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Cloud services may typically be rendered through dynamic infrastructure provisioning (e.g., within a relatively static hardware pool) in which operating systems and applications may be deployed and reconfigured to meet dynamic customer computational demands. Within a cloud environment's boundaries, images may be installed and overwritten, IP addresses may be modified and real and virtual processors may be allocated to meet changing business needs. Challenges may exist, however, in efficiently migrating cloud workloads between cloud environments if those workloads require access to large amounts of locally stored data.

SUMMARY

Embodiments of the present invention provide an approach for predictively migrating data between network computing environments (e.g., cloud computing environments). Specifically, in a typical embodiment, data access patterns for sets of data utilized by a set of services running in a first networked computing environment may be analyzed. Based on the analysis, one or more of the sets of data may be identified as candidates to be migrated from the first networked computing environment to a second networked computing environment. Then, a data migration protocol for the one or more sets of data to be migrated to the second networked computing environment may be generated based on the data access patterns and a predicted data migration time. Based on the data migration protocol, the one or more sets of data may then be migrated to the second networked computing environment.

A first aspect of the present invention provides a computer-implemented method for migrating data between networked computing environments, comprising: analyzing data access patterns for sets of data utilized by a set of services running in a first networked computing environment; identifying one or more of the sets of data as candidates to be migrated from the first networked computing environment to a second networked computing environment based on the data access patterns; generating a data migration protocol for the one or more sets of data to be migrated to the second networked computing environment based on the data access patterns and a predicted data migration time; and migrating the one or more sets of data to the second networked computing environment according to the data migration protocol.

A second aspect of the present invention provides a system for migrating data between networked computing environments, comprising: a memory medium comprising instructions; a bus coupled to the memory medium; and a processor coupled to the bus that when executing the instructions causes the system to: analyze data access patterns for sets of data utilized by a set of services running in a first networked computing environment; identify one or more of the sets of data as candidates to be migrated from the first networked computing environment to a second networked computing environment based on the data access patterns; generate a data migration protocol for the one or more sets of data to be migrated to the second networked computing environment based on the data access patterns and a predicted data migration time; and migrate the one or more sets of data to the second networked computing environment according to the data migration protocol.

A third aspect of the present invention provides a computer program product for migrating data between networked computing environments, the computer program product comprising a computer readable storage media, and program instructions stored on the computer readable storage media, to: analyze data access patterns for sets of data utilized by a set of services running in a first networked computing environment; identify one or more of the sets of data as candidates to be migrated from the first networked computing environment to a second networked computing environment based on the data access patterns; generate a data migration protocol for the one or more sets of data to be migrated to the second networked computing environment based on the data access patterns and a predicted data migration time; and migrate the one or more sets of data to the second networked computing environment according to the data migration protocol.

A fourth aspect of the present invention provides a method for deploying a system for migrating data between networked computing environments: providing a computer infrastructure being operable to: analyze data access patterns for sets of data utilized by a set of services running in a first networked computing environment; identify one or more of the sets of data as candidates to be migrated from the first networked computing environment to a second networked computing environment based on the data access patterns; generate a data migration protocol for the one or more sets of data to be migrated to the second networked computing environment based on the data access patterns and a predicted data migration time; and migrate the one or more sets of data to the second networked computing environment according to the data migration protocol.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for predictively migrating data between network computing environments (e.g., cloud computing environments). Specifically, in a typical embodiment, data access patterns for sets of data utilized by a set of services running in a first networked computing environment may be analyzed. Based on the analysis one or more of the sets of data may be identified as candidates to be migrated from the first networked computing environment to a second networked computing environment. Then, a data migration plan/protocol for the one or more sets of data to be migrated to the second networked computing environment may be generated based on the data access patterns and a predicted data migration time. Based on the data migration protocol, the one or more sets of data may then be migrated to the second networked computing environment.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
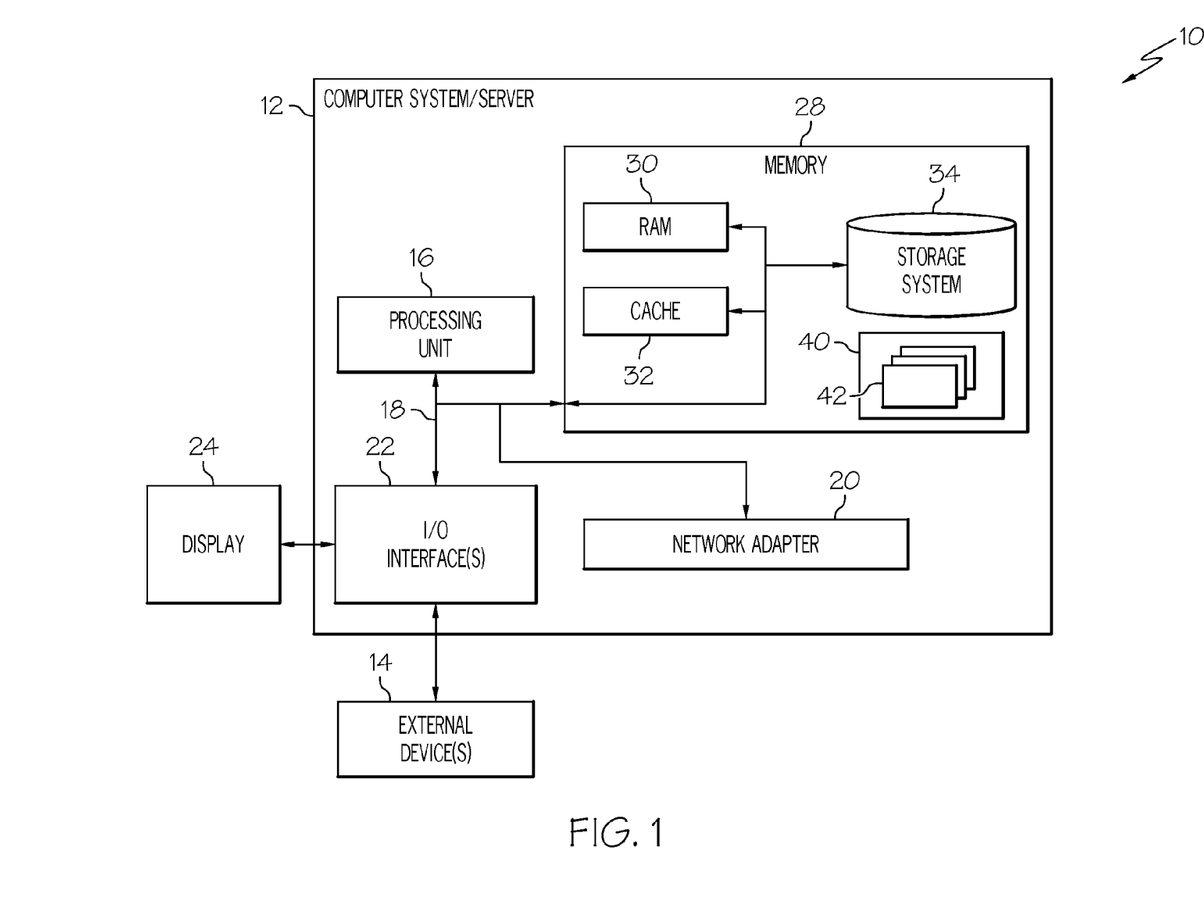
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
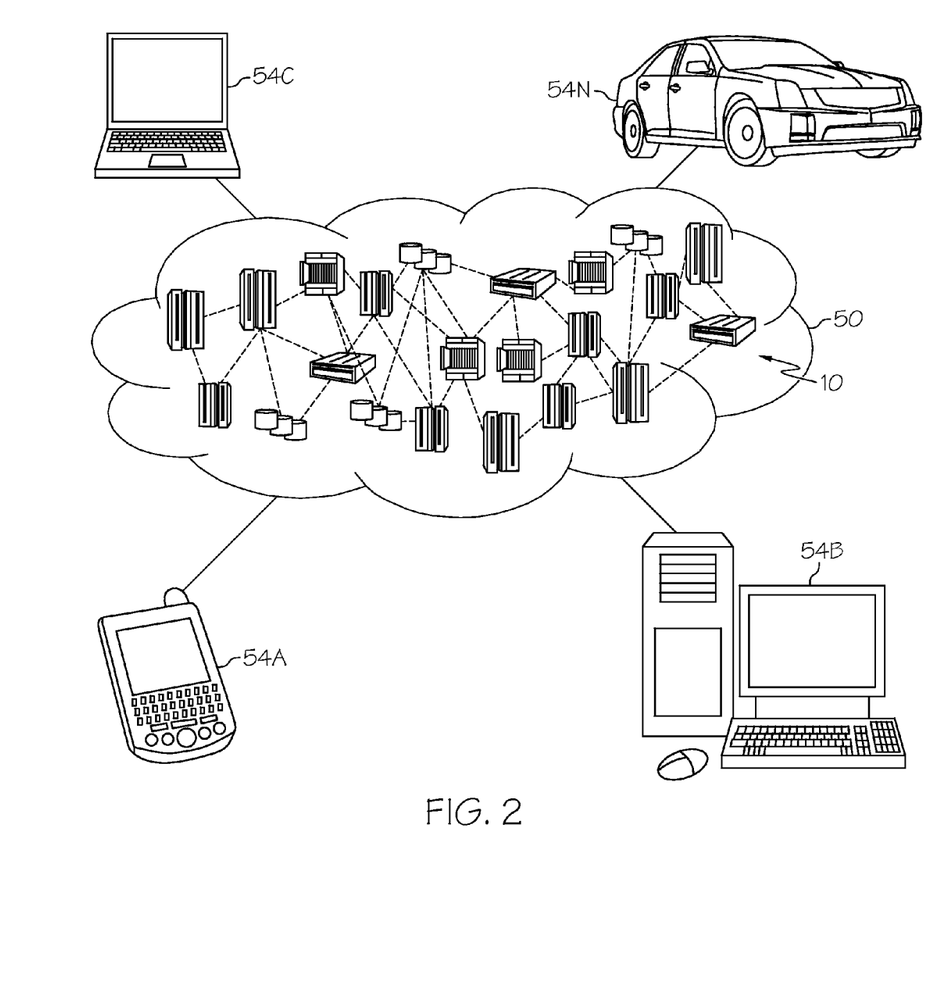
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
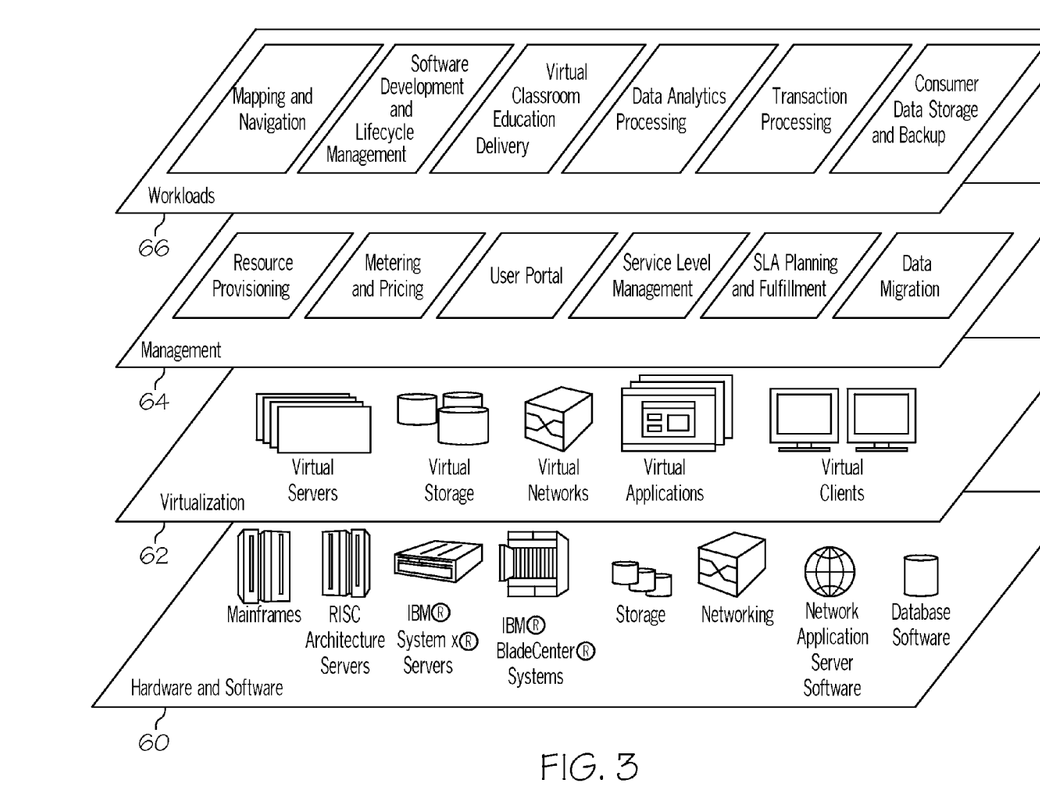
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is data migration, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the data migration functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
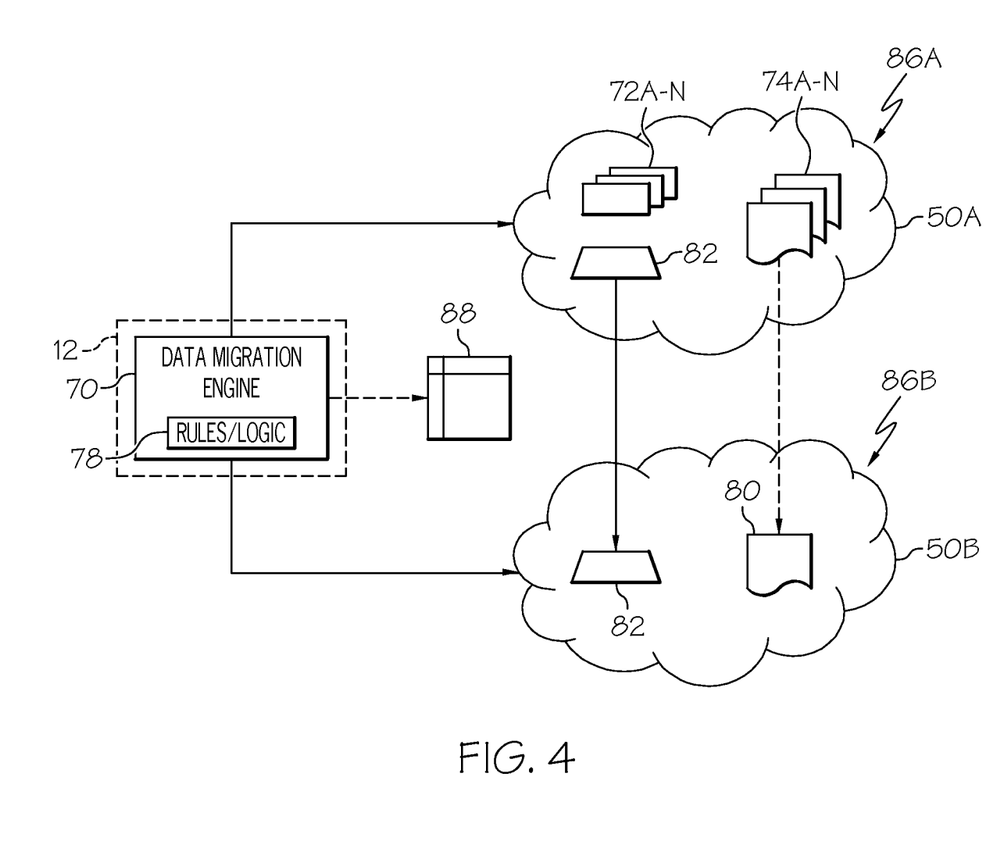
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86A-B (e.g., a cloud computing environment 50A-B). A stand-alone computer system/server 12 is shown in FIG. 4 for illustrative purposes only. In the event the teachings recited herein are practiced in a networked computing environment 86A-B, each client need not have a data migration engine (engine 70). Rather, engine 70 could be loaded on a server or server-capable device that communicates (e.g., wirelessly) with the clients to provide device protection therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 78 and/or provides data migration hereunder.

Along these lines, engine 70 may perform multiple functions similar to a general-purpose computer. Specifically, among other functions, engine 70 may (among other things): analyze data access patterns for sets of data 74A-N utilized by a set of services 72A-N running in a first networked computing environment 86A; identify one or more sets of data 80 of the sets of data 74A-N (and/or virtual machine(s) 82) as candidates to be migrated from the first networked computing environment 86A to a second networked computing environment 86B based on the data access patterns; prioritize the one or more sets of data 80 based on the data access patterns and a type of the one or more sets of data 80; generate a data migration plan/protocol 88 for the one or more sets of data 80 to be migrated to the second networked computing environment based on the data access patterns and a predicted data migration time; pre-stage the one or more sets of data 80 prior to the migration migrate the one or more sets of data to the second networked computing environment 86B according to the data migration protocol 88.

Figure 5:
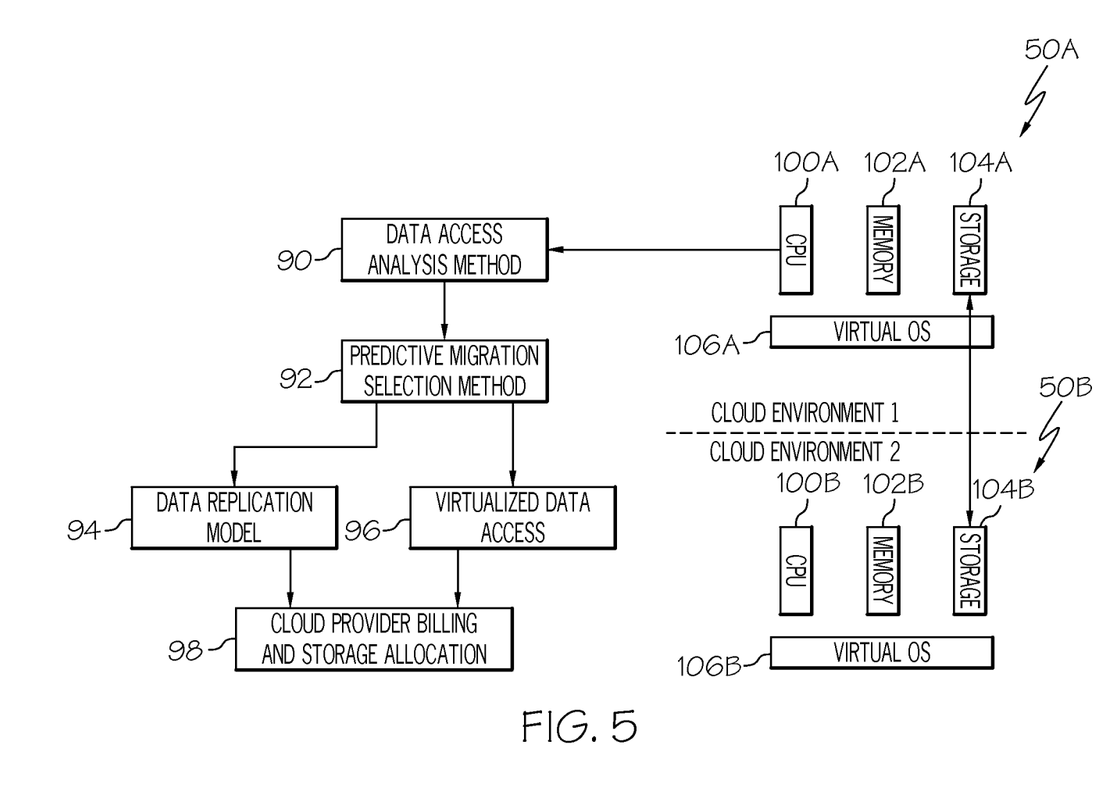
FIG. 5 depicts a component diagram according to an embodiment of the present invention.

Referring now to FIG. 5, a component diagram according to an embodiment of the present invention is shown. In general, the component diagram illustrates the components of and/or the methods implemented by engine 70. As depicted, the components generally comprise: a data access analysis method 90, a predictive migration selection method 92, a data replication method/model 94, a virtualized data access component 96, and a cloud provider billing and storage allocation component 98. As further shown, multiple cloud environments 50A-B are depicted with various computing resources such as central processing units (CPUs) 100A-B, memory mediums 102A-B, storage units 104A-B, and virtual operating systems (OS) 106A-B.

As indicated above, embodiments of the present invention entail the monitoring of data requirements for each service running in the cloud. It then uses that data to make decisions as to how to pre-stage data to another cloud in the event that the cloud service is a candidate for migration. This could happen because of cloud utilization, resource availability, or other considerations. The invention may, depending on implementation specifics, pre-stage as much data as possible to reduce the time required to migrate between clouds.

In general, the components perform the following functions:

The data access analysis method 90 monitors the cloud services and underlying resources within a cloud environment. This component looks for patterns in the type and location of data each cloud service is using. For example, 90% of access by reading data from a .csv file in a serialized way rather than random access of data on a database.

The predictive migration selection method 92 determines whether the cloud services and/or underlying data are a 'good candidate' for migration. This component essentially prioritizes which cloud services are candidates to move based on the types of data being accessed and the amount of analysis that has already been performed.

The data replication model/method 94 receives a list of cloud services that are good candidates for migration and determines the best mechanism to pre-stage data to another cloud. Data replication method 94 may prioritize 'read only' data first.

The virtualized data access component 96 provides the ability to access data that has not yet been migrated using an 'on demand' approach. If, for example, 90% of data that has been migrated is 'read-only', this component manages the 10% of data that was not migrated (e.g., because it involved read and writes).

These components will now be further described in greater detail herein-below:

I. Data Access Analysis Method 90:

This method may be invoked whenever data is accessed by a cloud VM that has been marked for potential migration. Analysis embodiments may vary. In one embodiment, the method may track the data access patterns of the virtual machine and builds a list of the most commonly access data regions. In other embodiments, more detailed analysis may be executed, and a common data access pattern is discovered. For example, this pattern may indicate that it is common for the VM to access block 45422, followed by block 83423432, followed by block 453342, etc. These patterns may be updated continuously or analysis may be time based, such that discrete analysis exists for various time blocks during a 24-hour period or a 7-day period.

II. Predictive Migration Selection Method 92:

This method leverages techniques to predict which virtual machines may be migrated between cloud environments. Building on those methods, method 92 selects which cloud instances may be migrated based on the data access analysis method. For example, if the methods select an instance for migration, but this method determines that sufficient analysis has not been completed to determine a data access pattern, then the instance priority is downgraded and migration is delayed. Likewise, if analysis has determined there is no access pattern (e.g., random access) and the data set is too large, this method may prevent that instance from migrating. Upon completion of this method, a set of instances, migration destinations, and identified patterns may be supplied to the data replication model/method 94.

III. Data Replication Model/Method 94:

This method receives a list of cloud instances, migration locations, and data access patterns from the predictive migration selection method. From that list, a data replication plan may be generated for moving data from one cloud environment to another. Two distinct data replication methods may exist. The appropriate method is selected based on the migration time period and the data access patterns.

A. Rapid Migration of Cloud Instances with Mostly Read Disk Patterns:

The system begins moving data blocks based on the predicted access patterns to the target cloud. Local changes to migrated blocks are noted and replicated to the target cloud. This method may replicate data in parallel from one or many clouds to one or many clouds. For example, this method may replicate the local data for six or eight potentially migrated instances at the same time between multiple static cloud providers. Once the amount of data specified by the migration protocol is replicated, the migration engine is invoked to migrate the instance.

B. Migration of Cloud Instances with Write Oriented Disk Patterns:

In this method, the invention may pre-stage all of the least often modified data first. This data may have the least likely chance of changing and, therefore, will incur less time and cost to transmit if no changes are made between the time data pre-staging starts and the actual migration completes. This method may utilize the analytics in the previous two methods to determine which data is the least likely to change. If that data consists of 90% of the total data, then the pre-staging will move only 90% of the data while the remaining 10% that is changing often will only be migrated if and when the cloud decides to migrate that VM. If this condition occurs, then the migration step only needs 10% of the data set thus saving time and cost.

IV. Virtualized Data Access 96 (and On-Demand Replication):

The approach described herein relies on a layer of virtualized disk access. The migrated instances may expect to have full access to all of its data, not just the migrated data selected by the replication plan. As such, a cloud VM will be presented with a virtual data storage device that appears to have all of the data available just prior to migration. However, items not part of the data plan will be replicated on demand from the original storage location. This approach permits the application to access all of the data it requires, even if that data falls outside of the plan. Initial access to data outside of the plan may be slower than that of planned data.

Figure 6:
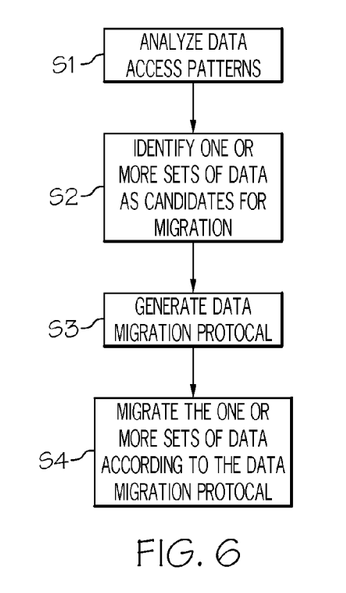
FIG. 6 depicts a method flow diagram according to an embodiment of the present invention.

V. Cloud Provider Billing and Storage Allocation Method 98:

Cloud providers may modify their billing methodologies or provide additional service offerings to facilitate the proposed invention. For example, cloud providers may have additional storage capacity that is unallocated to a cloud instance. The cloud provider could offer access to this storage at a reduced rate for those using this invention. However, that storage may not have a persistent guarantee (i.e., the storage may be reclaimed by the cloud provider at any time). Such a system may enable the embodiments of the present invention to have a tiered data migration protocol, such that the data most commonly accessed is migrated to persistent storage, but data that may be accessed will be migrated to temporary storage. Upon first access of this temporary storage, the cloud provider may convert the storage to persistent storage and charge the customer appropriately Referring now to FIG. 6, a method flow diagram according to an embodiment of the present invention is shown. In step S1, data access patterns for sets of data utilized by a set of services running in a first networked computing environment are analyzed. In step S2, one or more of the sets of data are identified as candidates to be migrated from the first networked computing environment to a second networked computing environment based on the data access patterns. In step S3, a data migration protocol is generated for the one or more sets of data to be migrated to the second networked computing environment based on the data access patterns and a predicted data migration time. In step S4, the one or more sets of data are migrated to the second networked computing environment according to the data migration protocol.

While shown and described herein as a data migration solution, it is understood that the invention further provides various alternative embodiments. For example, in one embodiment, the invention provides a computer-readable/useable medium that includes computer program code to enable a computer infrastructure to provide data migration functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide data migration functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for data migration. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for migrating data between networked computing environments, comprising:
    analyzing data access patterns for each service of a set of services having operating systems and applications that are dynamically configured for a particular customer running in a first networked computing environment, the data assess patterns including which sets of data are utilized by the service, a type of use of a utilized set of data, and an amount of use of the utilized set of data;
    identifying one or more of the services and associated sets of data as candidates to be migrated from the first networked computing environment to a second networked computing environment based on the data access patterns;
    prioritizing, for migration, at least one of the identified one or more sets of data based on the data access patterns and a type of the one or more sets of data wherein the prioritizing includes assigning a higher priority to sets of data that are read only;
    generating a data migration protocol for the services and at least one of the associated one or more sets of data to be migrated to the second networked computing environment based on the data access patterns and a predicted data migration time;

migrating the services and at least one of the associated one or more sets of data to the second networked computing environment according to the data migration protocol;

presenting a mechanism for the services to access to substantially all of the identified one or more sets of data, wherein the mechanism provides virtual access for sets of data that have not been migrated; and in response to receiving a request through the mechanism to access any of the one or more sets of data other than the migrated at least one of the one or more sets of data, replicating and migrating the requested any of the one or more sets of data to the second networked computing environment.

2. The computer-implemented method of claim 1, the identifying further comprising identifying one or more virtual machines to migrate from the first networked computing environment to the second networked computing environment based on the data access patterns.

3. The computer-implemented method of claim 1, the data migration protocol resulting in migration of read-only data before write-oriented data.

4. The computer-implemented method of claim 1, further comprising determining a frequency of modification of the one or more sets of data, the data migration protocol resulting in earlier migration with the services of the at least of the one or more sets of data based on a determined lower frequency of modification of the at least one of the one or more sets of data as compared to a determined frequency of modification of other sets of data of the one or more sets of data.

5. The computer-implemented method of claim 1, further comprising pre-staging the one or more sets of data prior to the migrating.

6. The computer-implemented method of claim 1, the first networked computing environment comprising a first cloud computing environment, and the second networked computing environment comprising a second cloud computing environment.

7. A system for migrating data between networked computing environments, comprising:
a memory medium comprising instructions;
a bus coupled to the memory medium; and
a processor coupled to the bus that when executing the instructions causes the system to:
analyze data access patterns for each service of a set of services having operating systems and applications that are dynamically configured for a particular customer running in a first networked computing environment, the data assess patterns including which sets of data are utilized by the service, a type of use of a utilized set of data, and an amount of use of the utilized set of data;
identify one or more of the services and associated sets of data as candidates to be migrated from the first networked computing environment to a second networked computing environment based on the data access patterns;
prioritize, for migration, at least one of the identified one or more sets of data based on the data access patterns and a type of the one or more sets of data, wherein the prioritizing includes assigning a higher priority to sets of data that are read only;
generate a data migration protocol for the services and at least one of the associated one or more sets of data to be migrated to the second networked computing environment based on the data access patterns and a predicted data migration time;
migrate the services and at least one of the associated one or more sets of data to the second networked computing environment according to the data migration protocol;
present a mechanism for the services to access to substantially all of the identified one or more sets of data, wherein the mechanism provides virtual access for sets of data that have not been migrated;
in response to receiving a request through the mechanism to access any of the one or more sets of data other than the migrated at least one of the one or more sets of data, replicate and migrate the requested any of the one or more sets of data to the second networked computing environment.

8. The system of claim 7, the memory medium further comprising instructions for causing the system to identify one or more virtual machines to migrate from the first networked computing environment to the second networked computing environment based on the data access patterns.

9. The system of claim 7, the data migration protocol resulting in migration of read-only data before write-oriented data.

10. The system of claim 7, the memory medium further comprising instructions to determine a frequency of modification of the one or more sets of data, the data migration protocol resulting in earlier migration with the services of the at least of the one or more sets of data based on a determined lower frequency of modification of the at least one of the one or more sets of data as compared to a determined frequency of modification of other sets of data of the one or more sets of data.

11. The system of claim 7, the memory medium further comprising instructions for causing the system to pre-stage the one or more sets of data prior to the migration.

12. The system of claim 7, the first networked computing environment comprising a first cloud computing environment, and the second networked computing environment comprising a second cloud computing environment.

13. A computer program product for migrating data between networked computing environments, the computer program product comprising a computer readable storage device, and program instructions stored on the computer readable storage device, to:
analyze data access patterns for each service of a set of services having operating systems and applications that are dynamically configured for a particular customer running in a first networked computing environment, the data assess patterns including which sets of data are utilized by the service, a type of use of a utilized set of data, and an amount of use of the utilized set of data;
identify one or more of the services and associated sets of data as candidates to be migrated from the first networked computing environment to a second networked computing environment based on the data access patterns;
prioritize, for migration, at least one of the identified one or more sets of data based on the data access patterns and a type of the one or more sets of data, wherein the prioritizing includes assigning a higher priority to sets of data that are read only;
generate a data migration protocol for the services and at least one of the associated one or more sets of data to be migrated to the second networked computing environment based on the data access patterns and a predicted data migration time;

migrate the services and at least one of the associated one or more sets of data to the second networked computing environment according to the data migration protocol;

present a mechanism for the services to access to substantially all of the identified one or more sets of data, wherein the mechanism provides virtual access for sets of data that have not been migrated;

in response to receiving a request through the mechanism to access any of the one or more sets of data other than the migrated at least one of the one or more sets of data, replicate and migrate the requested any of the one or more sets of data to the second networked computing environment.

14. The computer program product of claim 13, the computer readable storage device further comprising instructions to identify one or more virtual machines to migrate from the first networked computing environment to the second networked computing environment based on the data access patterns.

15. The computer program product of claim 13, the data migration protocol resulting in migration of read-only data before write-oriented data.

16. The computer program product of claim 13, the computer readable storage device further comprising instructions to determine a frequency of modification of the one or more sets of data, the data migration protocol resulting in earlier migration with the services of the at least one of the one or more sets of data based on a determined lower frequency of modification of the at least one of the one or more sets of data as compared to a determined frequency of modification of other sets of data of the one or more sets of data.

17. The computer program product of claim 13, the computer readable storage device further comprising instructions to pre-stage the one or more sets of data prior to the migration.

18. The computer program product of claim 13, the first networked computing environment comprising a first cloud computing environment, and the second networked computing environment comprising a second cloud computing environment.

19. A method for deploying a system for migrating data between networked computing environments:

providing a computer infrastructure being operable to:

analyze data access patterns for each service of a set of services having operating systems and applications that are dynamically configured for a particular customer running in a first networked computing environment, the data assess patterns including which sets of data are utilized by the service, a type of use of a utilized set of data, and an amount of use of the utilized set of data;

identify one or more of the services and associated sets of data as candidates to be migrated from the first networked computing environment to a second networked computing environment based on the data access patterns;

prioritize, for migration, at least one of the identified one or more sets of data based on the data access patterns and a type of the one or more sets of data, wherein the prioritizing includes assigning a higher priority to sets of data that are read only;

generate a data migration protocol for the services and at least one of the associated one or more sets of data to be migrated to the second networked computing environment based on the data access patterns and a predicted data migration time;

migrate the services and at least one of the associated one or more sets of data to the second networked computing environment according to the data migration protocol;

present a mechanism for the services to access to substantially all of the identified one or more sets of data, wherein the mechanism provides virtual access for sets of data that have not been migrated;

in response to receiving a request through the mechanism to access any of the one or more sets of data other than the migrated at least one of the one or more sets of data, replicate and migrate the requested any of the one or more sets of data to the second networked computing environment.

\* \* \* \* \*